(12) United States Patent
Deters (10) Patent No.: US 9,688,139 B1
(45) Date of Patent: *Jun. 27, 2017

(54) COMPACT DRIVE APPARATUS

(71) Applicant: Hydro-Gear Limited Partnership, Sullivan, IL (US)

(72) Inventor: Shane A. Deters, Mattoon, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/148,104

(22) Filed: May 6, 2016

Related U.S. Application Data (63) Continuation-in-part of application No. 14/043,988, filed on Oct. 2, 2013, now Pat. No. 9,334,938.

(60) Provisional application No. 61/708,775, filed on Oct. 2, 2012.

(51) Int. Cl.
| | |
|---|---|
| *F16D 39/00* | (2006.01) |
| *B60K 17/10* | (2006.01) |
| *F04B 1/14* | (2006.01) |
| *F04B 49/24* | (2006.01) |
| *F04B 1/12* | (2006.01) |
| *F16H 61/4157* | (2010.01) |
| *F16H 61/4043* | (2010.01) |
| *F16H 39/14* | (2006.01) |

(52) U.S. Cl.
CPC ............ *B60K 17/105* (2013.01); *F04B 1/124* (2013.01); *F04B 1/145* (2013.01); *F04B 1/146* (2013.01); *F04B 49/24* (2013.01); *F16H 39/14* (2013.01); *F16H 61/4043* (2013.01); *F16H 61/4157* (2013.01)

(58) Field of Classification Search
CPC .. F16H 39/14; F16H 61/4043; F16H 61/4157; B60K 17/105
See application file for complete search history.

(56) References Cited

U.S. PATENT DOCUMENTS

| | | |
|---|---|---|
| 2,165,895 A | 7/1939 | Joy |
| 2,413,393 A | 12/1946 | Vickers |
| 3,422,767 A | 1/1969 | McAlvay |
| 5,040,649 A | 8/1991 | Okada |
| 5,094,077 A | 3/1992 | Okada |
| 5,094,078 A | 3/1992 | Nishimura et al. |
| 5,119,632 A | 6/1992 | Nishimura et al. |
| 5,836,159 A | 11/1998 | Shimizu et al. |
| 6,185,936 B1 | 2/2001 | Hauser et al. |

(Continued)

*Primary Examiner* — Michael Leslie
(74) *Attorney, Agent, or Firm* — Neal, Gerber & Eisenberg LLP (57) ABSTRACT

A hydrostatic transaxle with a bypass mechanism is disclosed, the transaxle having a center section engaged to a housing, an axial piston pump disposed on the center section and driven by an input shaft, and an axial piston motor disposed on the center section having a cylinder block engaged to a motor output shaft. The pump is controlled by a swash plate having a pair of openings through which the input shaft and a bypass actuation rod pass. The bypass actuation rod has a cam formed on a first end that engages a block lift member. When the bypass actuation rod is rotated, the cam causes the block lift member to engage and lift the cylinder block of the axial piston motor off of the center section. A brake mechanism using brake puck disposed in a pocket formed in the center section is also disclosed.

20 Claims, 8 Drawing Sheets

(56) References Cited

U.S. PATENT DOCUMENTS

| | | | |
|---|---|---|---|
| 6,256,989 B1 | 7/2001 | Hauser et al. | |
| 6,370,876 B1 | 4/2002 | Langenfeld | |
| 6,385,971 B1 | 5/2002 | Abend et al. | |
| 6,681,570 B2 | 1/2004 | Takada et al. | |
| 6,755,019 B1 | 6/2004 | Phanco | |
| 6,895,748 B2 | 5/2005 | Williams et al. | |
| 6,904,748 B2 | 6/2005 | Takada et al. | |
| 7,017,343 B2 | 3/2006 | Takada et al. | |
| 7,111,459 B1 | 9/2006 | Brookens et al. | |
| 7,121,092 B1 | 10/2006 | Phanco et al. | |
| 7,134,276 B1 | 11/2006 | Langenfeld et al. | |
| 7,174,712 B1 | 2/2007 | Brookens et al. | |
| 7,360,358 B1 | 4/2008 | Phanco et al. | |
| 7,510,035 B1 | 3/2009 | Irikura | |
| 7,841,429 B2 | 11/2010 | Irikura | |
| 8,220,257 B2 | 7/2012 | Iida et al. | |
| 9,334,938 B1 * | 5/2016 | Deters | F16H 39/14 |

\* cited by examiner

COMPACT DRIVE APPARATUS

CROSS-REFERENCE TO RELATED APPLICATION

This application is a continuation of U.S. patent application Ser. No. 14/043,988, filed Oct. 2, 2013, which claims the benefit of U.S. Provisional Application Ser. No. 61/708,775, filed Oct. 2, 2012. These prior applications are incorporated herein by reference in their entirety.

BACKGROUND OF THE INVENTION

This application relates to a hydrostatic drive apparatus generally, and in particular to a hydrostatic transaxle with a bypass mechanism and a brake mechanism. The transaxle is intended for use in driving a vehicle or other powered machine or apparatus.

SUMMARY OF THE INVENTION

An improved hydrostatic transaxle with a bypass mechanism and a brake mechanism is disclosed herein, as described in more detail below. The transaxle can be mounted on a vehicle or other powered machine or apparatus.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles as taught herein and understood by one of ordinary skill in the art. It will be further understood that for clarity in certain cross-sectional views, certain elements are not shown in cross-section, as doing so would not assist in the understanding of the disclosure herein. For example, in FIG. 5, the various shafts depicted are not cross-sectioned merely for clarity in the drawing.

Figure 1:
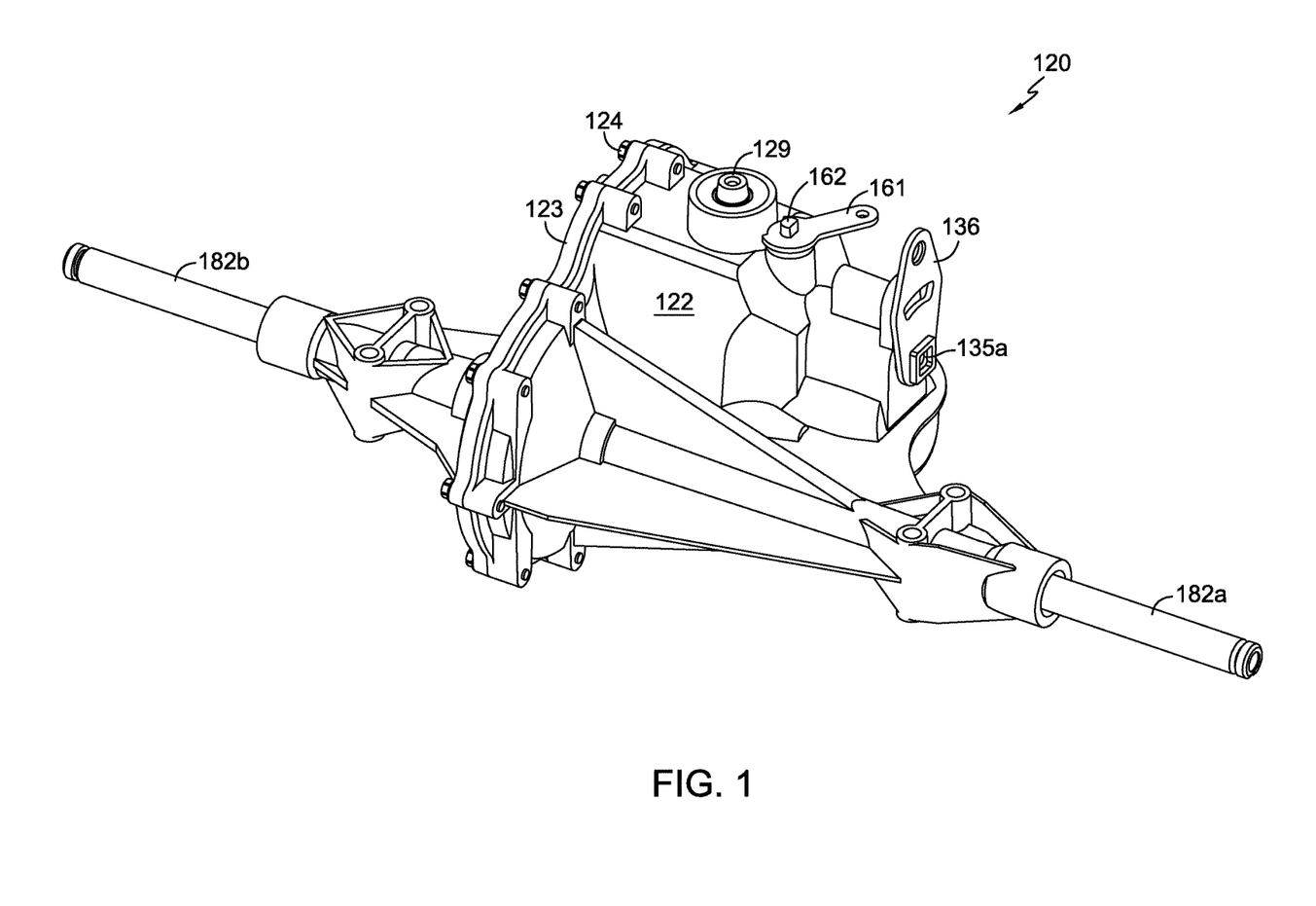
FIG. 1 is a perspective view of a first embodiment of a transaxle in accordance with the teachings herein.
Figure 2:
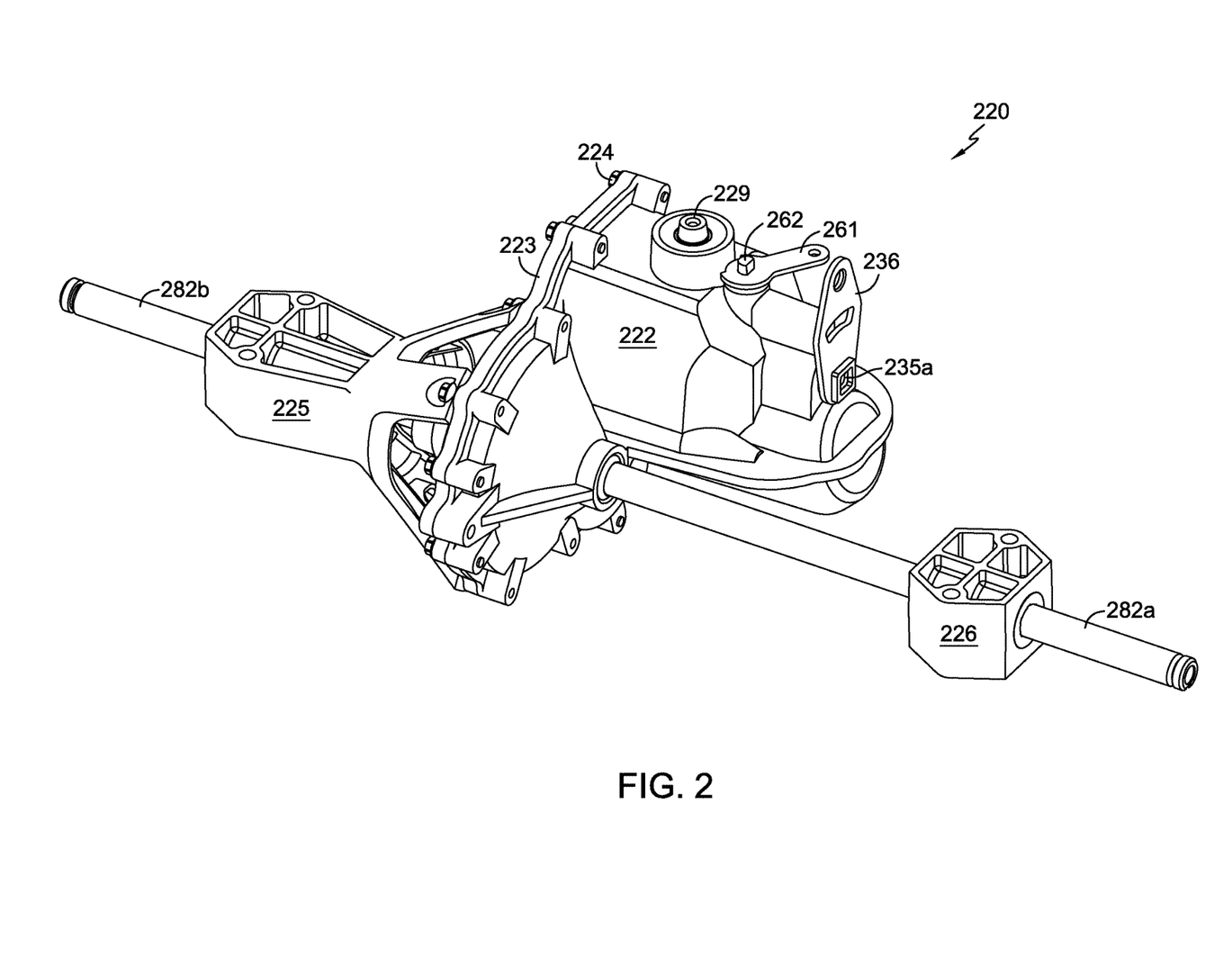
FIG. 2 is a perspective view of a second embodiment of a transaxle in accordance with the teachings herein.

FIG. 1 shows a first embodiment of a hydrostatic transaxle 120. Side housing 123 is secured to main housing 122 with fasteners 124. Axle 182b extends from side housing 123 and axle 182a extends from main housing 122. Pump input shaft 129 also extends from main housing 122 and may have a pulley (not shown) fixed thereon capable of receiving a drive belt (not shown). Bypass arm 161 is fixed to a portion of bypass rod 162 extending from main housing 122 and control arm 136 is fixed to trunnion 135a extending from main housing 122.

FIGS. 2-8 show a second embodiment of a hydrostatic transaxle 220, which can be identical in most respects to hydrostatic transaxle 120, particularly with respect to its internal components. Hydrostatic transaxle 220, however, has an axle horn 225 disposed about axle 282b that is separate from, and fastened to, side housing 223. Transaxle 220 further includes a detached pillow block 226 disposed about axle 282a. Axle horn 225 and pillow block 226 allow mounting of hydrostatic transaxle 220 to a frame, e.g. of a vehicle (not shown).

Figure 3:
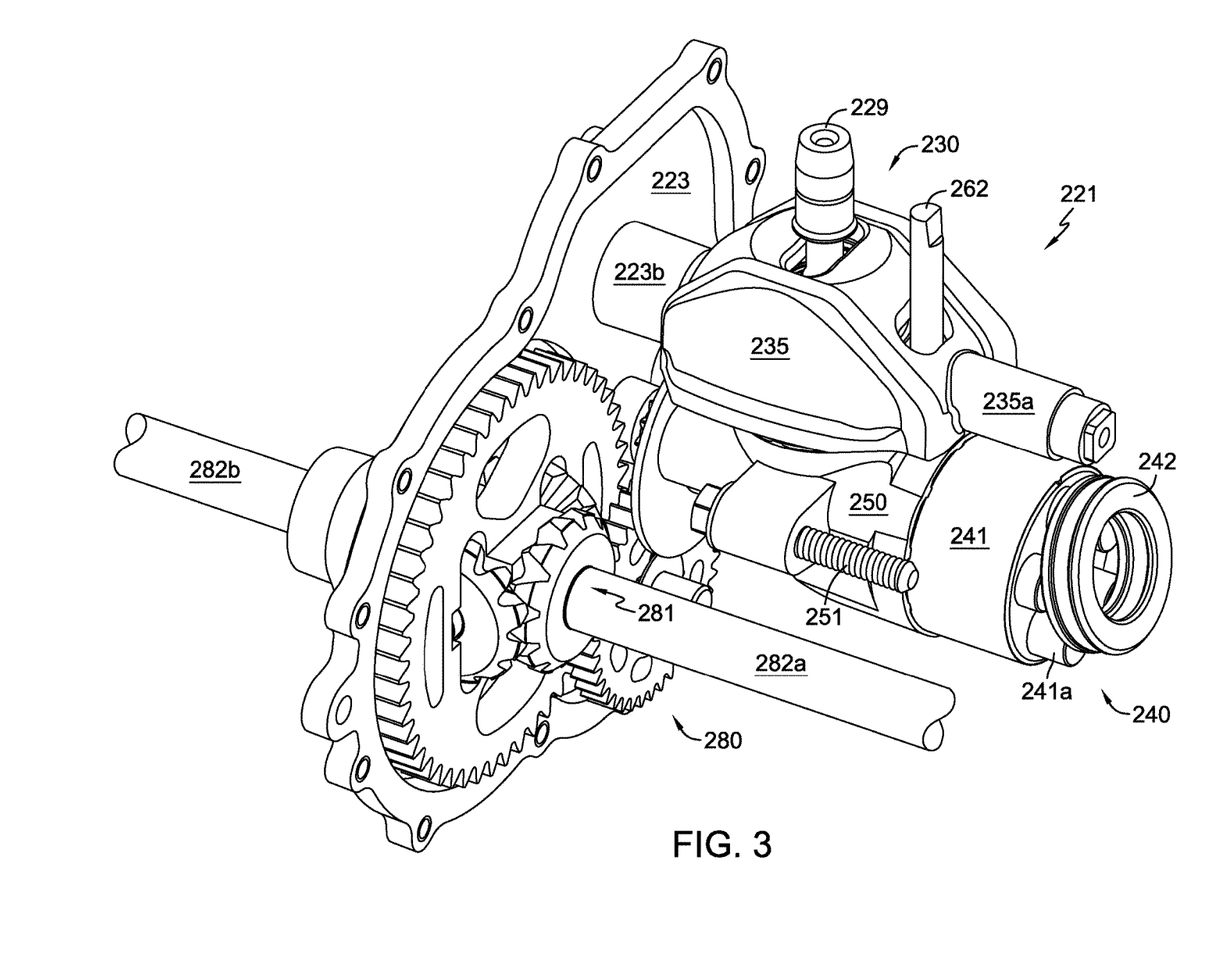
FIG. 3 is a perspective view of a portion of the transaxle of FIG. 2 with certain components removed for clarity.

FIG. 3 identifies transmission 221, reduction gear train 280, and differential 281. Transmission 221 includes axial piston pump 230 which hydraulically communicates with axial piston motor 240 through the porting (not shown) of center section 250. Center section 250 is secured in main housing 222 by fasteners 251.

Figure 5:
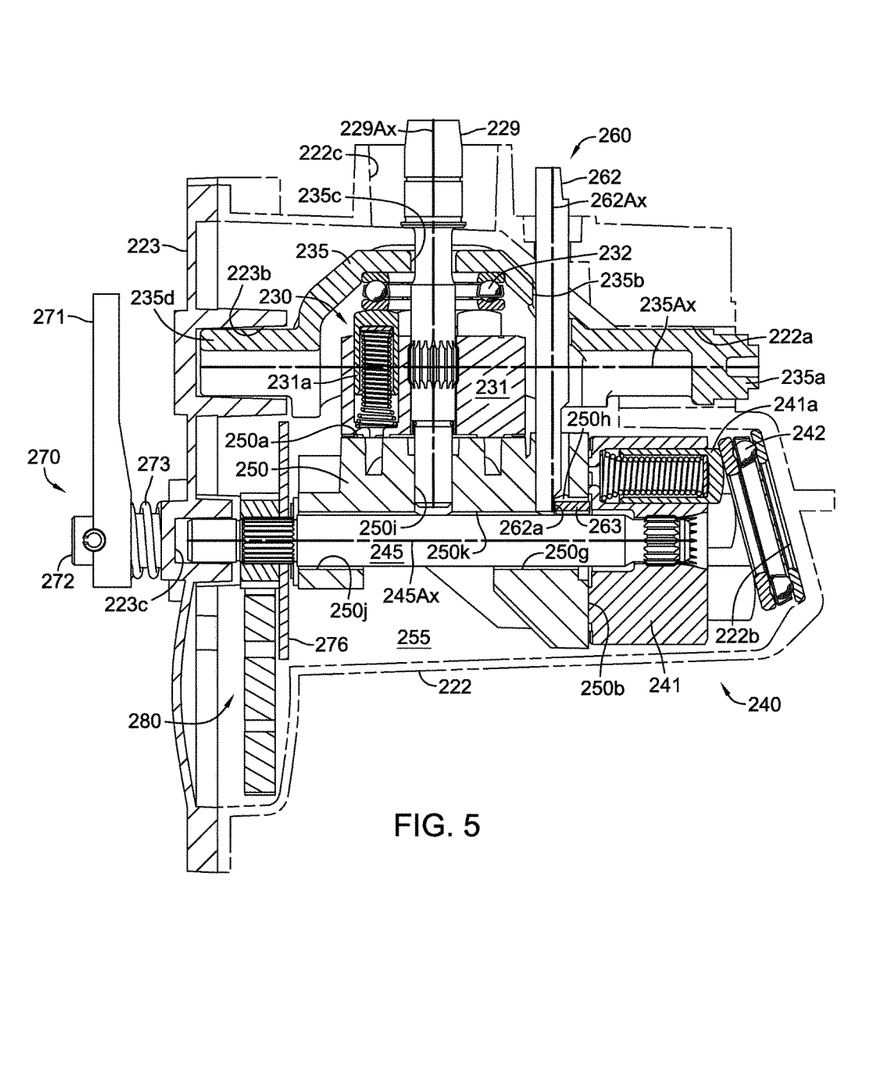
FIG. 5 is a cross-sectional view along line 5-5 in FIG. 4.

FIG. 5 shows many of the details of transmission 221. Pump input shaft 229 extends through opening 235c in swash plate 235 to the exterior of main housing 222. Pump input shaft 229 is rotatably supported in input shaft bore 250i of center section 250 and is further supported by a bearing (not shown) in input shaft opening 222c. Pump cylinder block 231 is engaged to pump input shaft 229 which rotates about axis of rotation 229Ax. Pump cylinder block 231 has pump pistons 231a axially disposed therein and runs on pump running surface 250a of center section 250. Swash plate 235 controls the output of axial piston pump 230 in a known manner as a result of the rotation of swash plate 235 about axis of rotation 235Ax. Such rotation changes the angle of pump thrust bearing 232, which is seated in swash plate 235, relative to the axial alignment of pump pistons 231a to generate hydraulic fluid flow. Swash plate 235 has a trunnion 235a which is rotatably journaled in trunnion support opening 222a, and a trunnion 235d which is rotatably supported in trunnion support pocket 223b. Thus, swash plate 235 is rotatably supported by both the main housing 222 and the side housing 223.

Motor cylinder block 241 has pistons 241a axially disposed therein and runs on motor running surface 250b, which generally lies perpendicular to pump running surface 250a. The flow of hydraulic fluid from axial piston pump 230 into pistons 241a causes the pistons 241a to bear against motor thrust bearing 242. Because motor thrust bearing 242 is seated at a fixed angle in pocket 222b of main housing 222, motor cylinder block 241 is urged to rotate. Motor cylinder block 241 is slidingly engaged to motor output shaft 245 at a first end and causes it to rotate about axis of rotation 245Ax. Reduction gear train 280 is engaged to motor output shaft 245 proximate to its second end, being driven thereby. Motor output shaft 245 is rotatably journaled in center section 250 via a pair of cylindrical bores 250g, 250j separated by an intervening channel 250k, and further supported at its second end by a motor shaft support pocket 223c formed in side housing 223. Channel 250k lies generally perpendicular to, and is intersected by, input shaft bore 250i.

Figure 8:
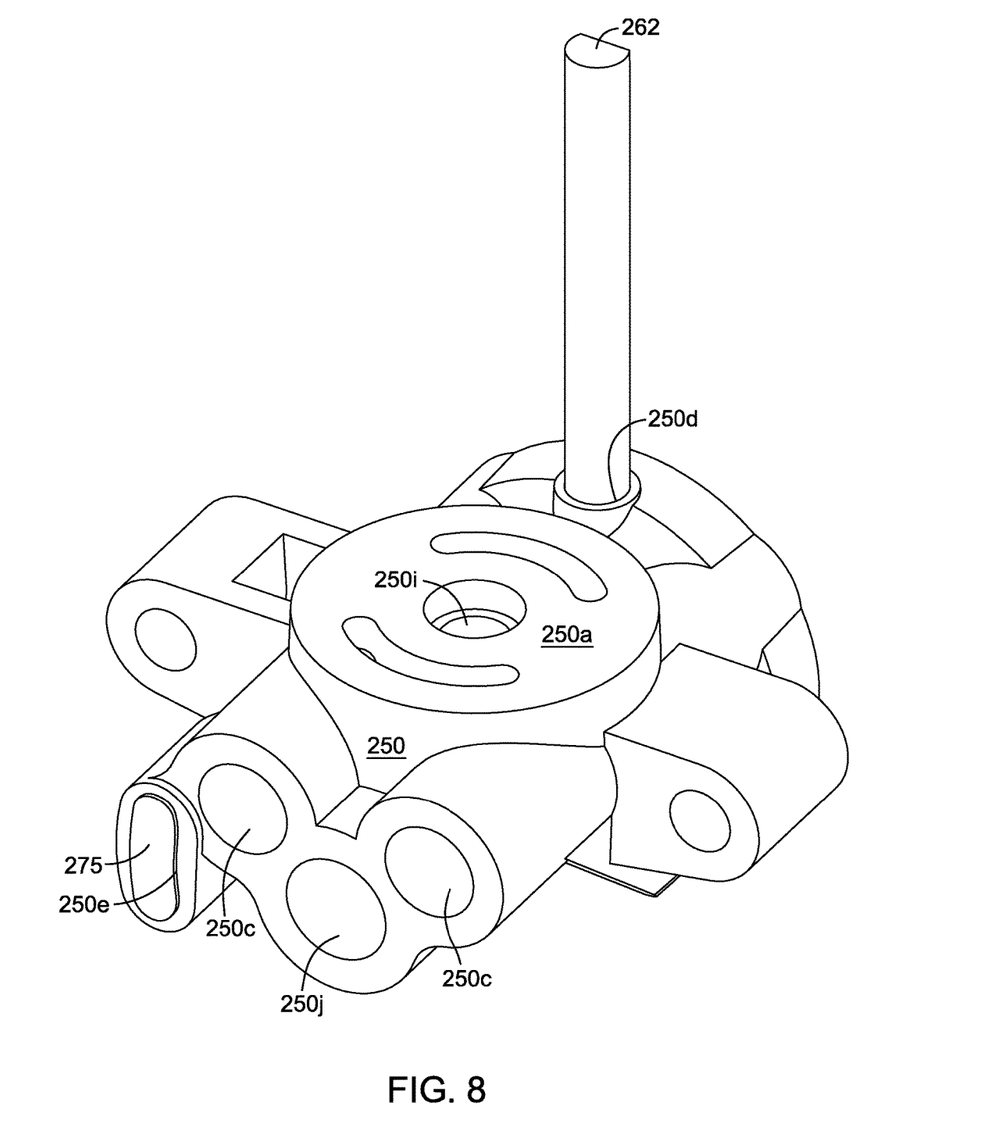
FIG. 8 is a perspective view of the portion of the transaxle shown in FIG. 7, rotated 180° about the axis of bypass rod 262, with certain additional components removed for clarity.

A hydraulic circuit exists between axial piston pump 230 and axial piston motor 240 that is normally closed during operation of transaxle 220 with the exception of make-up hydraulic fluid from sump 255, which can enter the circuit through one of check plug ports 250c shown in FIG. 8. Check plug ports 250c communicate with the internal porting (not shown) of center section 250 and accept check plugs (not shown) that will allow make-up hydraulic fluid to be drawn into the check plug port 250c that communicates with the low pressure or suction side of the hydraulic circuit, compensating for fluid losses during operation. In order to minimize the size of center section 25, as can be seen in FIG. 8, the two check plug ports 250c and the bore 250j form a triangular shape on one end of center section 250.

A block-lift bypass mechanism 260 allows axles 282a and 282b to freely rotate when hydrostatic transaxle 220 is not under power. This allows an operator of a vehicle having hydrostatic transaxle 220 to freely move the vehicle without powering it up, e.g. when servicing the vehicle. Bypass actuation rod 262 extends through swash plate opening 235b and passes through main housing 222 to its exterior, the bypass actuation rod 262 being oriented generally parallel to pump input shaft 229. Similar to opening 235c, swash plate opening 235b is sized, shaped, and located to allow rotation of swash plate 235 without interference with the function of pump thrust bearing 232. Bypass actuation rod 262 is rotatably supported in bypass rod support bore 250d as shown in FIG. 8. Block lift member 263 is movably disposed in cavity 250h of center section 250 and bears against bypass rod cam surface 262a. When bypass actuation rod 262 is rotated about axis of rotation 262Ax, cam surface 262a causes block lift member 263 to contact and lift motor cylinder block 241 from the motor running surface 250b. This lift breaks hydraulic fluid communication between motor pistons 241a and the fluid ports 250f in motor running surface 250b; and more generically, it breaks the fluid communication between axial piston pump 230 and axial piston motor 240. Thus, motor output shaft 245, reduction gear train 280, and axles 282a, 282b are free to rotate without hydraulic resistance. The location of bypass actuation rod 262 extending through an opening in swash plate 235 permits a smaller, more compact unit.

Figure 4:
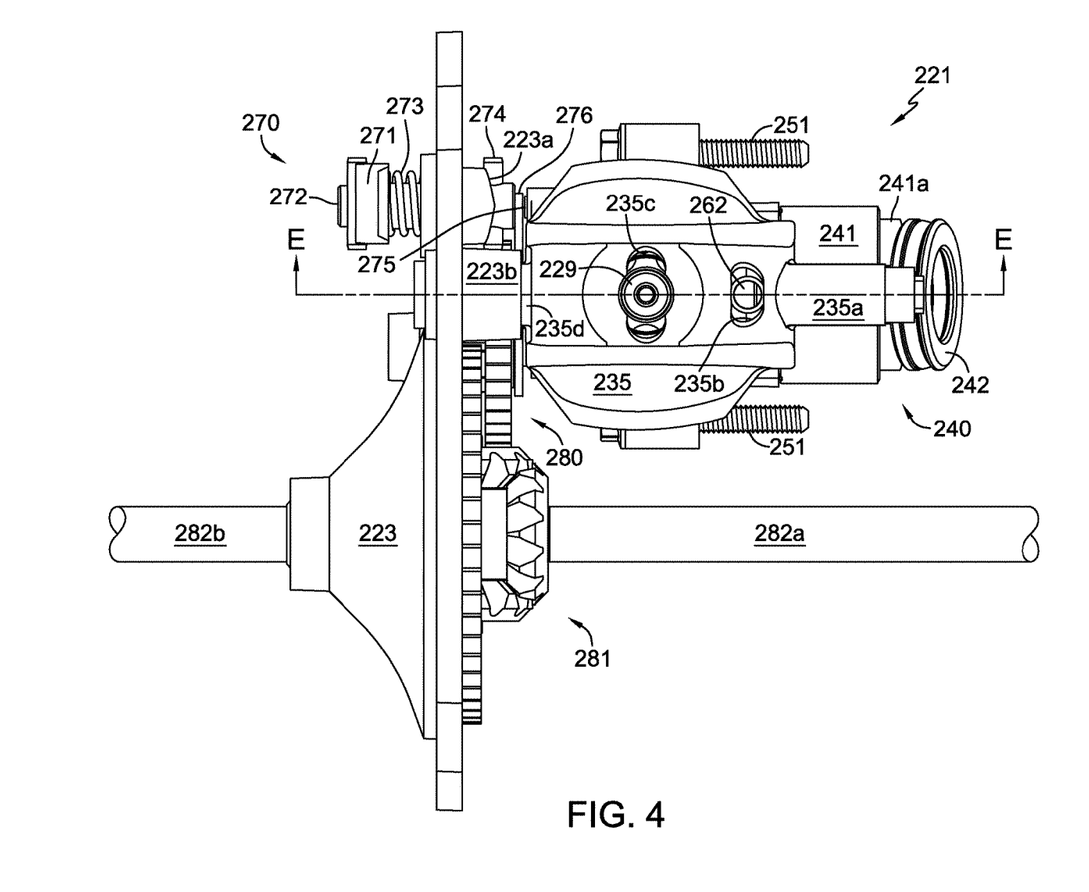
FIG. 4 is a plan view of the portion of the transaxle shown in FIG. 3.
Figure 6:
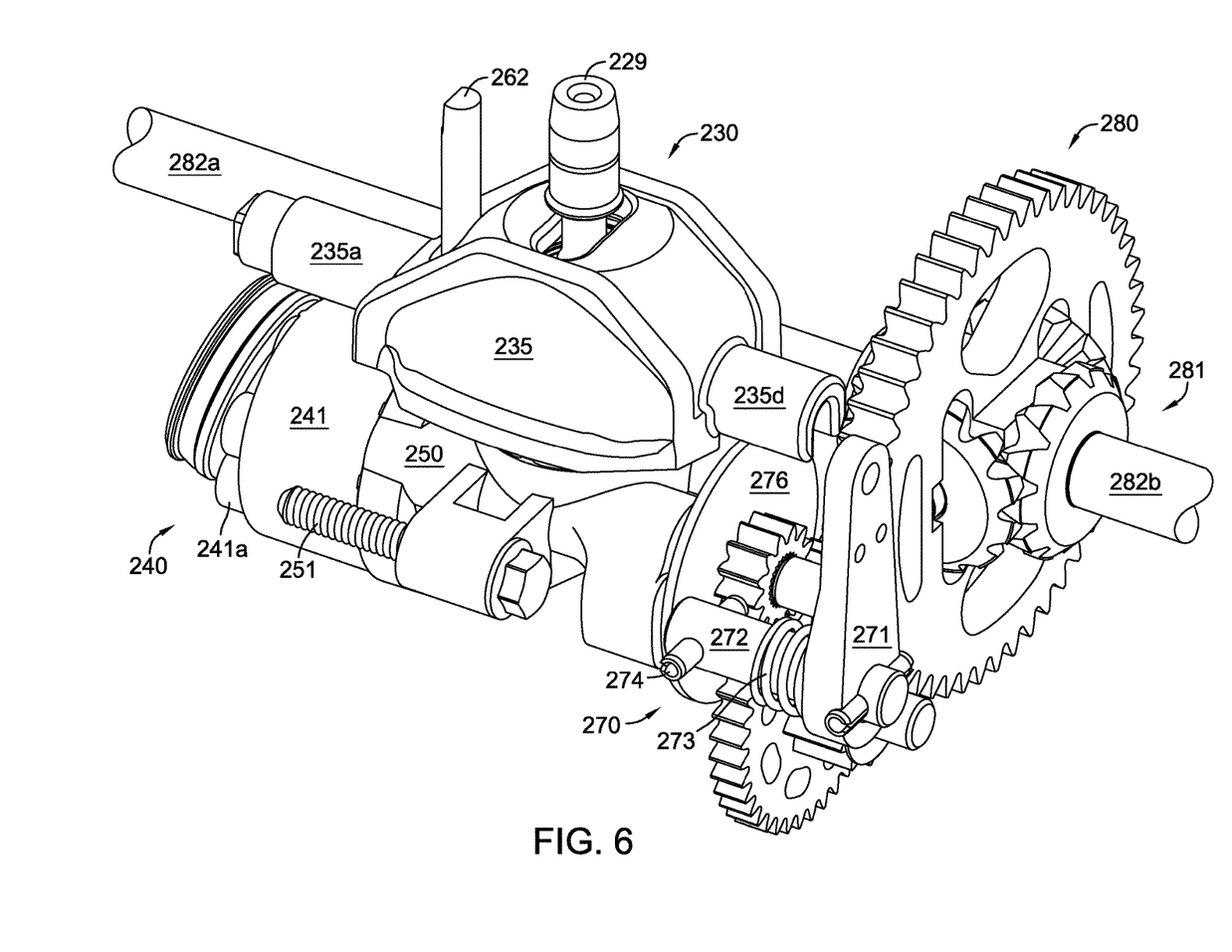
FIG. 6 is a perspective view of the portion of the transaxle shown in FIG. 3, rotated 180° about the axis of input shaft 229, with the side housing removed for clarity.
Figure 7:
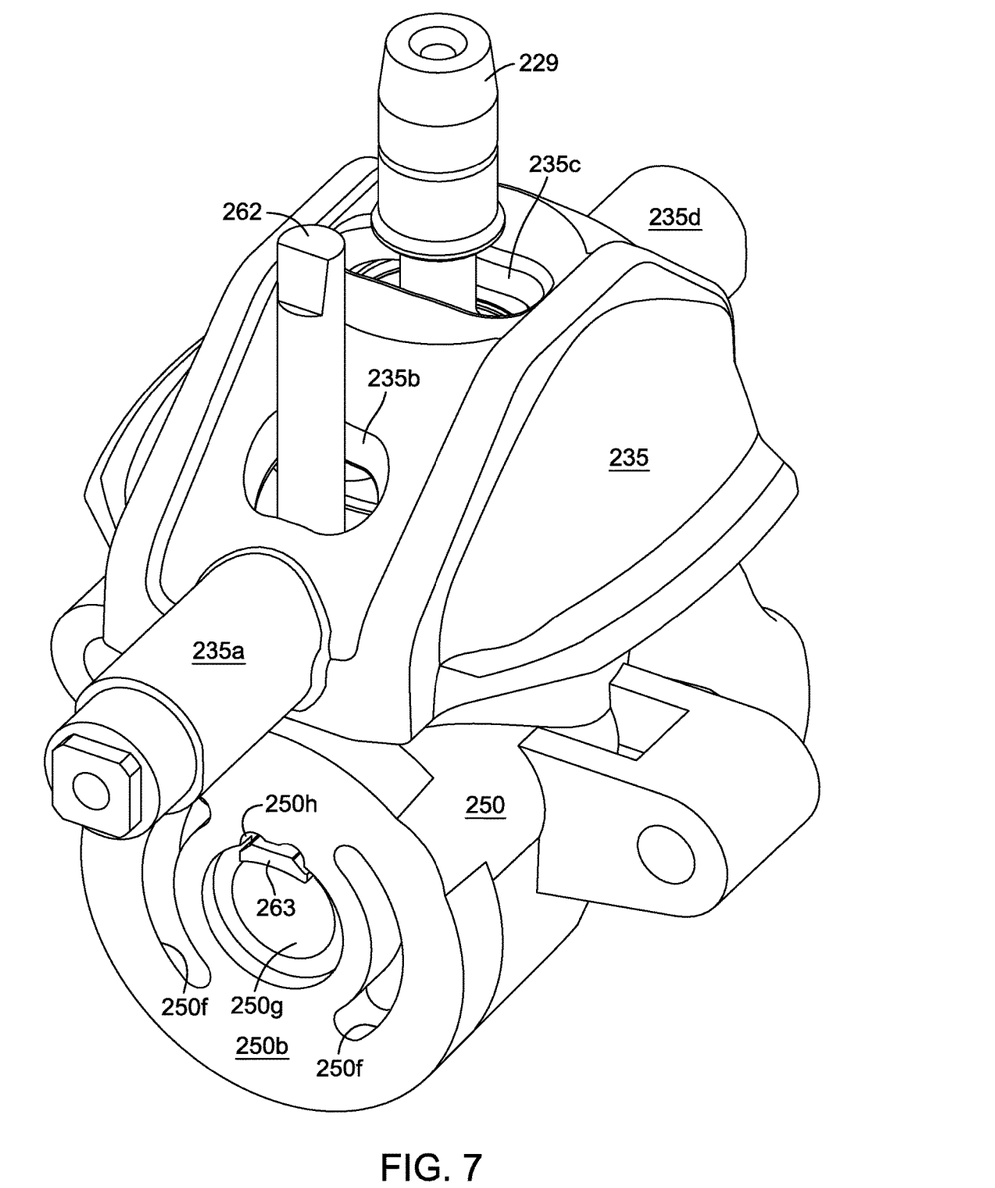
FIG. 7 is a perspective view of the portion of the transaxle shown in FIG. 3, rotated 90° about the axis of input shaft 229, with certain additional components removed for clarity.

FIGS. 4-6 best illustrate brake mechanism 270. Pin 274 is transversely fixed in brake shaft 272 and rides on a cam projection 223a formed on side housing 223. When brake shaft 272 is rotated either clockwise or counterclockwise, via corresponding rotation of brake arm 271 from an initial position to a rotated position, the interaction of pin 274 and cam projection 223a moves brake shaft 272 axially into contact with brake rotor 276. Brake rotor 276 is disposed about and slidingly engaged to motor output shaft 245, proximate to its second end. As brake shaft 272 is rotated further, additional axial movement forces brake rotor 276 into frictional engagement with brake puck 275, to brake motor output shaft 245. As can be seen most clearly in FIG. 8, brake puck 275 is disposed in a brake puck pocket 250e formed in center section 250, and brake puck pocket 250e is preferably adjacent to one of the check plug ports 250c to minimize the size of center section 250. Spring 273 is disposed about brake shaft 272 between brake arm 271 and side housing 223, bearing against each to bias brake mechanism 270 to a disengaged state. The bidirectional nature of brake mechanism 270 permits an external brake linkage (not shown) to actuate brake mechanism 270 in either rotational direction.

Referring again to FIG. 5, it can be seen that axes of rotation 229Ax, 235Ax, 245Ax, and 262Ax lie within a common plane. This also allows for a more compact transaxle suitable for application to smaller utility vehicles.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of any appended claims and any equivalent thereof.

What is claimed is:

1. A drive apparatus comprising:
   a housing forming a sump;
   an axial piston pump located in the sump and hydraulically connected to a hydraulic motor through a hydraulic circuit;
   a swash plate rotatably disposed in the housing and engaged to the axial piston pump for varying the output thereof;
   a bypass mechanism disposed in the housing to open the hydraulic circuit to place the drive apparatus into a bypass state where the hydraulic circuit is open to the sump; and
   a bypass actuation rod having a first end engaged to the bypass mechanism and being capable of actuating the bypass mechanism, wherein the bypass actuation rod extends through an opening in the swash plate and out of the housing.

2. The drive apparatus of claim 1, wherein the first end of the bypass actuation rod is formed as a cam.

3. The drive apparatus of claim 1, further comprising an input shaft extending into the housing and driving the axial piston pump, wherein the bypass actuation rod is oriented generally parallel to the input shaft.

4. The drive apparatus of claim 1, further comprising a center section disposed in the housing, wherein the hydraulic circuit is integrally formed in the center section, and the pump and the hydraulic motor are both rotatably disposed on the center section.

5. The drive apparatus of claim 4, further comprising a motor output shaft driven by the hydraulic motor; and a brake mechanism for providing a braking force to the motor output shaft, comprising a brake shaft extending through the housing and having a proximal end disposed proximate to one side of a brake rotor, and a brake puck disposed in a brake puck pocket formed in the center section, proximate to a second side of the brake rotor.

6. The drive apparatus of claim 5, wherein the hydraulic motor is an axial piston motor.

7. A drive apparatus, comprising:
a hydraulic mounting member disposed in a housing, the hydraulic mounting member comprising a motor running surface connected to a hydraulic porting system forming a hydraulic circuit;
a hydraulic motor disposed on the motor running surface and in fluid communication with a hydraulic pump through the hydraulic porting system;
a motor output shaft driven by the hydraulic motor; and
a brake mechanism for providing a braking force to the motor output shaft, comprising a brake shaft extending through the housing and having a first end disposed proximate to one side of a brake rotor, and a brake puck disposed in a brake puck pocket formed in the hydraulic mounting member, proximate to a second side of the brake rotor.

8. The drive apparatus of claim 7, further comprising a cam formed on an internal surface of the housing to move the brake shaft into contact with the brake rotor, bringing the brake rotor into frictional engagement with the brake puck, when the brake shaft is rotated.

9. The drive apparatus of claim 7, wherein the brake puck is located opposite the brake shaft, and the braking force is transmitted along an axis of rotation of the brake shaft.

10. The drive apparatus of claim 7, wherein the hydraulic mounting member further comprises a first bore disposed on one side thereof and a second bore disposed on a second side thereof, opposite the first side, wherein the motor output shaft is supported by both the first bore and the second bore.

11. The drive apparatus of claim 10, wherein the hydraulic mounting member further comprises a first check plug port and a second check plug port located on the second side thereof, wherein the first check plug port and the second check plug port are both in fluid communication with the hydraulic porting system and a sump formed in the housing, and wherein the first check plug port, the second check plug port and the second bore form a triangular shape.

12. The drive apparatus of claim 11, wherein the brake puck pocket is located adjacent to one of the first check plug port or the second check plug port.

13. The drive apparatus of claim 7, further comprising an axial piston pump mounted on a pump running surface formed on the hydraulic mounting member and a swash plate engaged to the axial piston pump for varying the output thereof, wherein the housing comprises a main housing and a side housing, and the swash plate is rotatably supported by both the main housing and the side housing.

14. The drive apparatus of claim 13, wherein the motor output shaft is directly engaged to and driven by the hydraulic motor, and one end of the motor output shaft extends into a motor shaft support pocket formed in the side housing.

15. The drive apparatus of claim 7, wherein the motor output shaft is directly engaged to and driven by the hydraulic motor.

16. The drive apparatus of claim 15, wherein the brake rotor is disposed about and slidingly engaged to the motor output shaft.

17. A drive apparatus, comprising:
a housing forming a sump;
a center section disposed in the sump and comprising:
a first side, a second side perpendicular to the first side and a third side parallel and opposite to the second side;
a pump running surface formed on the first side and having a first fluid port and a second fluid port;
a motor running surface formed on the second side and having a third fluid port and a fourth fluid port;
a hydraulic porting system disposed internal to the center section to form a hydraulic circuit to connect the pump running surface and the motor running surface;
a first bore formed on the second side, between the third fluid port and the fourth fluid port; and
a second bore formed on the third side, wherein the first bore and the second bore are coaxial;
a first check plug port and a second check plug port formed on the third side adjacent to the second bore, wherein the first check plug port and the second check plug port are both in fluid communication with the hydraulic porting system and the sump, wherein the first check plug port, the second check plug port and the second bore form a triangular shape on the third side;
a hydraulic motor disposed on the motor running surface and in fluid communication with a hydraulic pump disposed on the pump running surface through the hydraulic porting system; and
a motor output shaft engaged to the hydraulic motor to be driven thereby, wherein the motor output shaft extends into and is supported by the first bore and the second bore.

18. The drive apparatus of claim 17, further comprising:
a brake puck pocket formed in the third side of the center section, and a brake puck disposed in the brake puck pocket;
a brake rotor disposed about and slidingly engaged to the motor output shaft, the brake rotor having a first side adjacent to the brake puck and a second side, opposite the first side; and
a brake shaft extending through the housing and having a first end disposed proximate to the second side of the brake rotor.

19. The drive apparatus of claim 18, wherein the brake puck pocket is located adjacent to one of the first check plug port or the second check plug port.

20. The drive apparatus of claim 17, further comprising:
a swash plate rotatably disposed in the housing and engaged to the hydraulic pump for varying the output thereof;
a bypass mechanism disposed in the housing to open the hydraulic circuit to place the drive apparatus into a bypass state where the hydraulic circuit is open to the sump; and
a bypass actuation rod having a first end engaged to the bypass mechanism and being capable of actuating the bypass mechanism, wherein the bypass actuation rod extends through an opening in the swash plate and out of the housing.

* * * * *

UNITED STATES PATENT AND TRADEMARK OFFICE
CERTIFICATE OF CORRECTION

PATENT NO. : 9,688,139 B1  
APPLICATION NO. : 15/148104  
DATED : June 27, 2017  
INVENTOR(S) : Shane A. Deters Page 1 of 1

It is certified that error appears in the above-identified patent and that said Letters Patent is hereby corrected as shown below:

On the Title Page

Item (63), Related U.S. Application Data, Line 1, "Continuation-in-part" should be changed to --Continuation--.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*